US012228969B2

United States Patent
Huang et al.

(10) Patent No.: US 12,228,969 B2
(45) Date of Patent: Feb. 18, 2025

(54) FOLDABLE ELECTRONIC DEVICE

(71) Applicant: ASUSTeK COMPUTER INC., Taipei (TW)

(72) Inventors: Te-Wei Huang, Taipei (TW); Pei-Chiang Lin, Taipei (TW); Sih-Ci Li, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 54 days.

(21) Appl. No.: 17/991,733

(22) Filed: Nov. 21, 2022

(65) Prior Publication Data

US 2024/0103575 A1    Mar. 28, 2024

(30) Foreign Application Priority Data

Sep. 26, 2022    (TW) .................................. 111136319

(51) Int. Cl.
*G06F 1/16* (2006.01)

(52) U.S. Cl.
CPC .......... *G06F 1/1641* (2013.01); *G06F 1/1656* (2013.01)

(58) Field of Classification Search
CPC .............................. G06F 1/1641; G06F 1/1656
See application file for complete search history.

(56) References Cited

U.S. PATENT DOCUMENTS

| | | | | |
|---|---|---|---|---|
| 8,723,824 B2* | 5/2014 | Myers | .................... | G06F 1/1626 345/173 |
| 9,560,189 B2* | 1/2017 | Lee | ..................... | H04M 1/0268 |
| 9,570,042 B2* | 2/2017 | Jeong | ..................... | G09G 3/035 |
| 9,829,924 B2* | 11/2017 | Shin | ........................ | G06F 1/1656 |
| 10,001,809 B2* | 6/2018 | Seo | ......................... | G09F 27/005 |
| 10,146,257 B2 | 12/2018 | Alonso et al. | | |
| 10,683,591 B1* | 6/2020 | Podhajny | ............... | D03D 11/02 |
| 11,079,867 B2* | 8/2021 | Jiang | ..................... | G06F 3/04164 |
| 11,216,041 B2* | 1/2022 | Hosoya | ................. | G06F 3/0484 |
| 11,249,520 B2* | 2/2022 | Han | ........................ | F16C 11/12 |
| 11,493,954 B2* | 11/2022 | Soh | ..................... | H04M 1/0268 |
| 11,520,382 B2* | 12/2022 | Shibayama | ........... | G06F 1/1652 |
| 11,525,746 B2* | 12/2022 | Bok | ..................... | G06F 1/1643 |
| 2016/0180757 A1* | 6/2016 | Um | ........................ | G06F 1/1652 345/82 |
| 2016/0187935 A1* | 6/2016 | Tazbaz | ................ | H04M 1/0216 361/679.55 |
| 2020/0285279 A1 | 9/2020 | Zimmerman et al. | | |

(Continued)

FOREIGN PATENT DOCUMENTS

| | | |
|---|---|---|
| CN | 108139775 | 6/2018 |
| CN | 209965484 | 1/2020 |

(Continued)

*Primary Examiner* — Rockshana D Chowdhury

(74) *Attorney, Agent, or Firm* — JCIPRNET

(57) ABSTRACT

A foldable electronic device includes a first body, a second body, a pivot and a key module. The pivot is pivotally connected between the first body and the second body. The first body and the second body is configured to rotate relatively to each other through the pivot. The key module includes a bendable substrate and a sensor embedded in the bendable substrate. The bendable substrate is connected between the first body and the second body and covers an outer side of the pivot. The sensor generates a sensing signal in response to a press of a user upon the bendable substrate.

9 Claims, 8 Drawing Sheets

(56) References Cited

U.S. PATENT DOCUMENTS

| | | | | |
|---|---|---|---|---|
| 2021/0132793 | A1* | 5/2021 | Burns | G06F 3/04886 |
| 2022/0052124 | A1* | 2/2022 | Kim | G06F 3/03545 |
| 2022/0317729 | A1* | 10/2022 | Caplow-Munro | G06F 1/1677 |
| 2023/0119209 | A1* | 4/2023 | Choi | G06F 1/1641 |
| | | | | 361/679.01 |
| 2023/0176612 | A1* | 6/2023 | Tyagi | G06F 1/1616 |
| 2023/0195167 | A1* | 6/2023 | Jung | G06F 1/1641 |
| | | | | 455/575.4 |
| 2023/0214031 | A1* | 7/2023 | Hung | G06F 3/03545 |
| 2023/0229194 | A1* | 7/2023 | Kishimoto | G06F 1/1681 |
| | | | | 361/679.01 |
| 2023/0341896 | A1* | 10/2023 | Shai | G09G 5/003 |

FOREIGN PATENT DOCUMENTS

| | | |
|---|---|---|
| CN | 111854646 | 2/2022 |
| CN | 114070909 | 2/2022 |

\* cited by examiner

FOLDABLE ELECTRONIC DEVICE

CROSS-REFERENCE TO RELATED APPLICATION

This application claims the priority benefit of Taiwan application Ser. No. 111136319, filed on Sep. 26, 2022. The entirety of the above-mentioned patent application is hereby incorporated by reference herein and made a part of this specification.

BACKGROUND

Technical Field

The disclosure relates to a foldable electronic device.

Description of Related Art

In recent years, foldable mobile electronic devices have gradually appeared in the market, and the technology has become more mature. The foldable mobile electronic devices (such as, Smart phone, tablet, laptop, etc.) may include a first body and a second body pivotally connected to each other. For example, the first body and the second body can be the main body and the screen body, respectively, and the screen body and the main body can be in two states of overlapping and folded operation and unfolding operation by means of pivoting through a pivot.

However, the foldable device has not yet appeared in the gaming mobile device market. With the increasing demand of users for game devices with high dynamic and high sound and light effects, how to design the best mechanism configuration and the best finger operation area under the limited space of the foldable mobile electronic device has become an urgent problem in the industry.

SUMMARY

According to an aspect of this disclosure, a foldable electronic device is provided. The foldable electronic device includes a first body, a second body, a pivot and a key module. The pivot is pivotally connected between the first body and the second body. The first body and the second body is configured to rotate relatively to each other through the pivot. The key module includes a bendable substrate and a sensor embedded in the bendable substrate. The bendable substrate is connected between the first body and the second body and covers an outer side of the pivot. The sensor generates a sensing signal in response to a press of a user upon the bendable substrate.

Based on the above, the foldable electronic device of the present disclosure sets the key module at the pivot on the back of the body, so that the bendable substrate of the key module covers the outer side of the pivot, and the sensor is embedded in the bendable substrate. With this configuration, when holding the foldable electronic device, the user can easily press the key module located on the back of the body with a finger, so that the sensor generates a corresponding sensing signal in response to the user's pressing. And the controller of the circuit board can receive the sensing signal and control the foldable electronic device to make corresponding commands accordingly. Therefore, the foldable electronic device of the present disclosure can expand the function keys in a limited space, and its setting position is more convenient for the user to press and operate. Thus, the design flexibility, operation convenience and user friendliness of the foldable electronic device can be improved.

DESCRIPTION OF THE EMBODIMENTS

Figure 1:
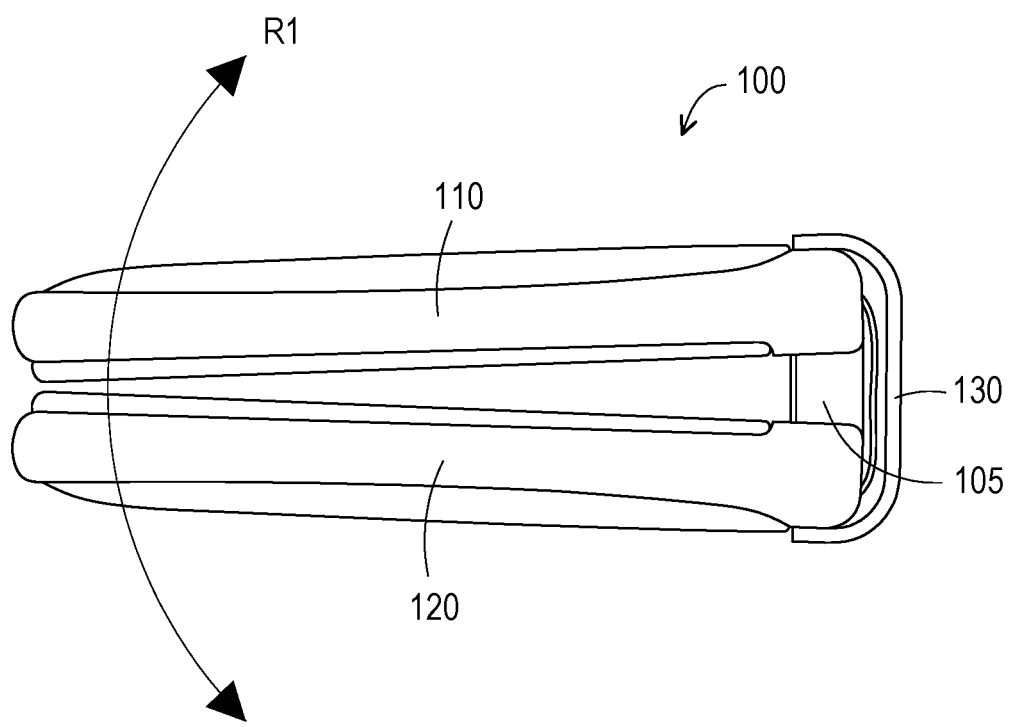
FIG. 1 is a schematic diagram of a foldable electronic device in a closed state according to an embodiment of the present disclosure.

The foregoing and other technical contents, features and effects of the present disclosure will be clearly presented in the following detailed description of the embodiments with reference to the drawings. The directional terms mentioned in the following examples, such as: "up", "down", "front", "rear", "left", "right", etc., only refer to the directions of the attached drawings. Therefore, the directional terms are used to illustrate rather than limit the present disclosure. Also, in the following embodiments, the same or similar elements will be given the same or similar reference numerals.

Figure 2:
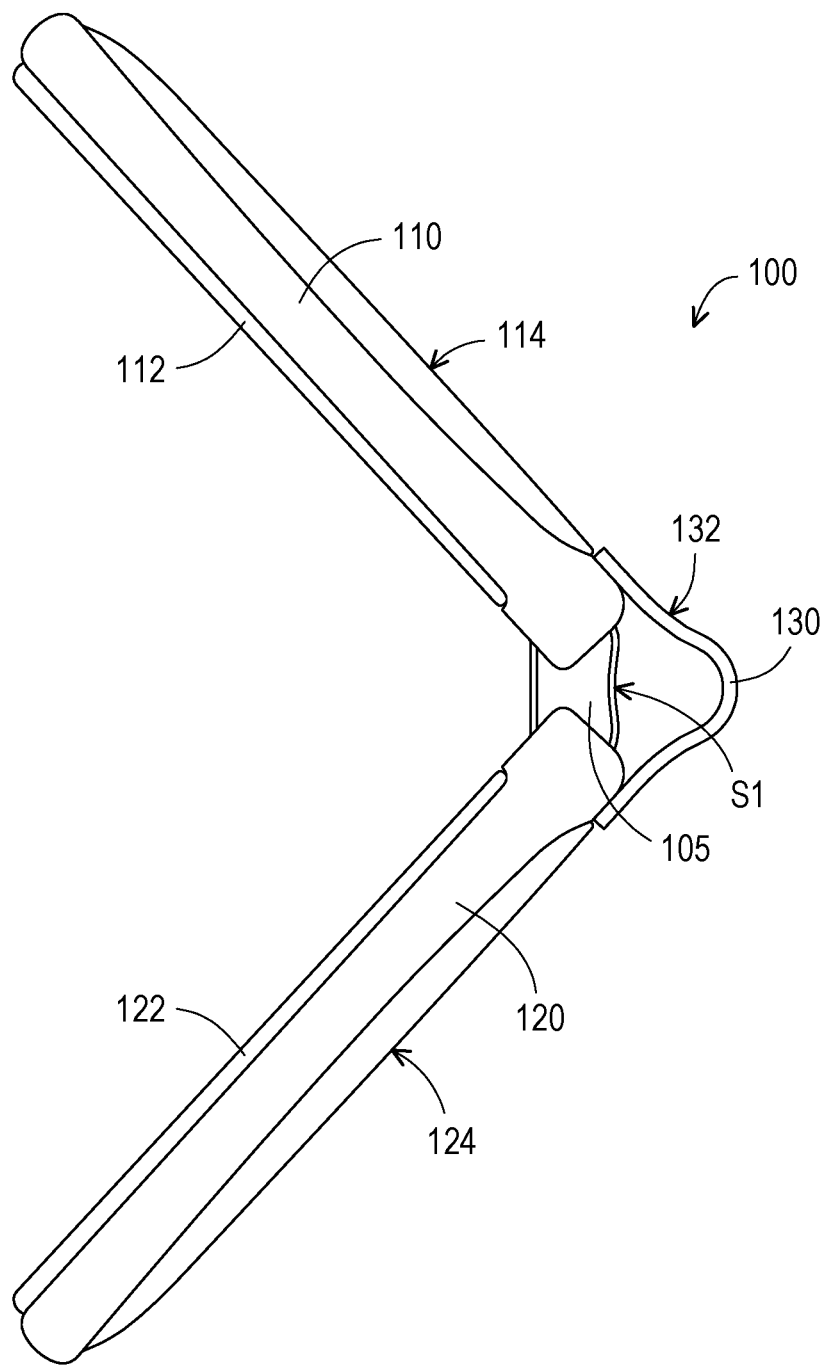
FIG. 2 is a schematic diagram of the foldable electronic device of FIG. 1 in an open state.
Figure 3:
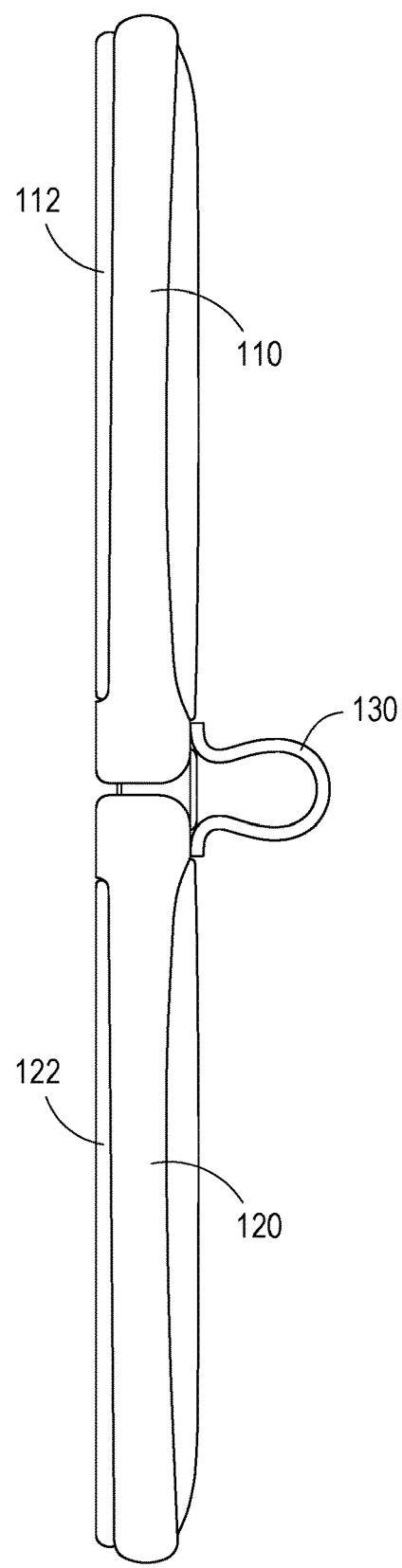
FIG. 3 is a schematic diagram of a foldable electronic device of FIG. 1 in a fully opened state.
Figure 4:
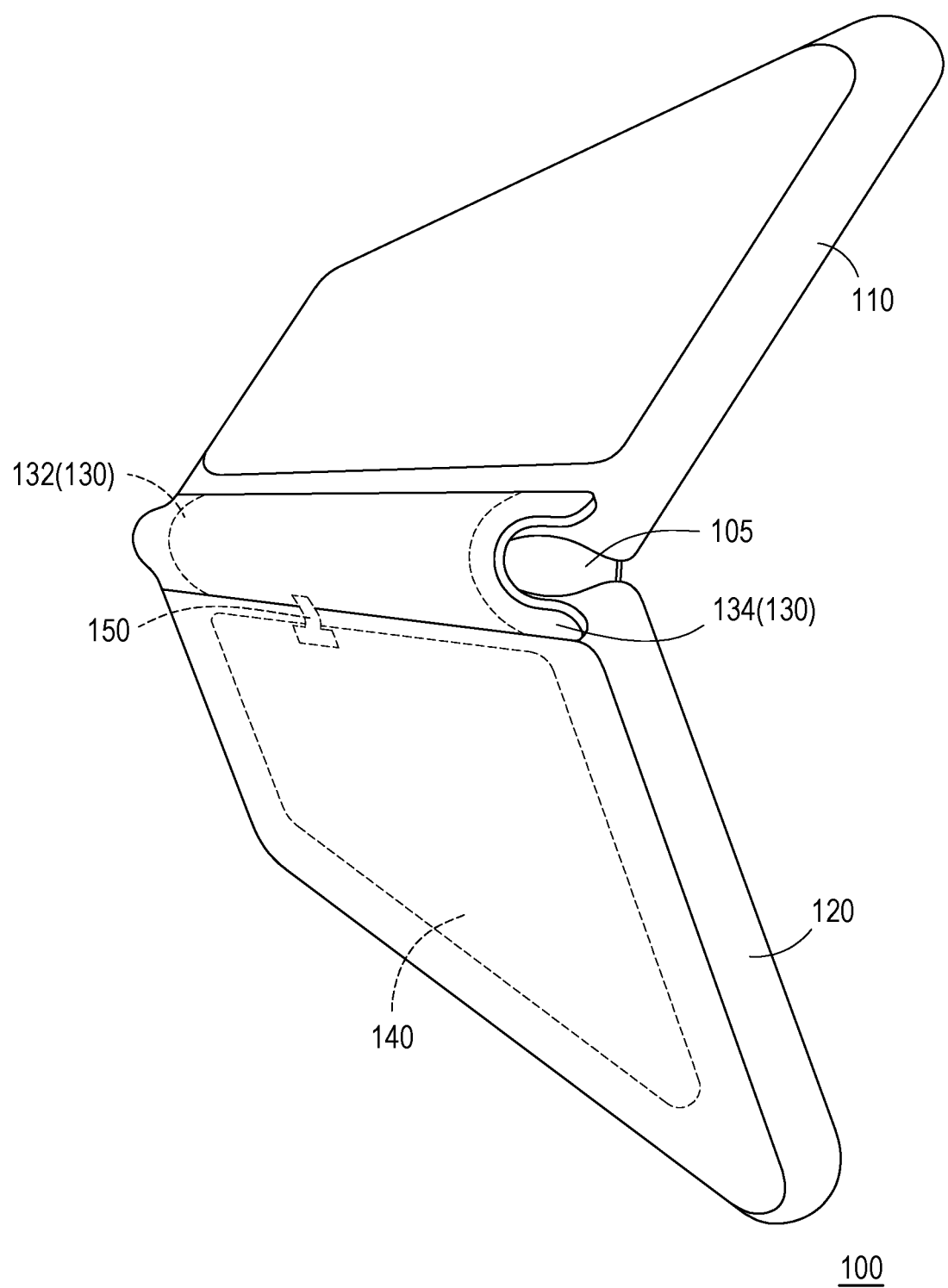
FIG. 4 is a schematic perspective view of a foldable electronic device according to an embodiment of the present disclosure.

FIG. 1 is a schematic diagram of a foldable electronic device in a closed state according to an embodiment of the present disclosure. FIG. 2 is a schematic diagram of the foldable electronic device of FIG. 1 in an open state. FIG. 3 is a schematic diagram of a foldable electronic device of FIG. 1 in a fully opened state. Referring to FIG. 1 to FIG. 3, a foldable electronic device 100 includes a first body 110, a second body 120, a pivot 105 and a key module 130. In the embodiment, the first body 110 may be, for example, a display body, which may include a display 112. And the second body 120 may be, for example, a main body, which can include a mainboard disposed in the second body 120 (the circuit board 140 as shown in FIG. 4). In an embodiment, the second body 120 may include, for example, a touch module or a keyboard module 122. The embodiment is not limited to this. In other embodiment, the first body 110 and the second body 120 of the foldable electronic device 100 may also be a dual-display design. That is, the first body 110 may include the first touch display, and the second body 120 may include the second touch display. The present disclosure does not limit the component configurations and functions of the first body 110 and the second body 120.

In some embodiment, the pivot 105 is connected between the first body 110 and the second body 120, so that the first body 110 and the second body 120 can be rotated relative to each other through the pivot 105 along the rotation direction R1 from the closed state shown in FIG. 1 to the open state shown in FIG. 2 and the fully opened state shown in FIG. 3. When the foldable electronic device 100 is in the open state as shown in FIG. 2, an angle may be formed between the first body 110 and the second body 120, and the angle may be less than about 180 degrees. When the foldable electronic device 100 is in the fully open state as shown in FIG. 3, the corresponding surfaces of the first body 110 and the second body 120 may be substantially coplanar (such as, the included angle is about 180 degrees).

FIG. 4 is a schematic perspective view of a foldable electronic device according to an embodiment of the present disclosure. It should be noted here that, the sensor 132, the circuit board 140 and the connector 150 in FIG. 4 are components embedded in the foldable electronic device 100. Therefore, it is presented in perspective and depicted with thin lines. Referring to FIG. 2 and FIG. 4, in an embodiment, the key module 130 may include a sensor 132 and a bendable substrate 134, wherein the sensor 132 is embedded within the bendable substrate 134. The bendable substrate 134 is connected between the first body 110 and the second body 120 and covers the outer side S1 of the pivot 105. In the embodiment, first body 110 includes a first back surface 114 and the second body 120 includes a second back surface 124. And the bendable substrate 134 connects the first back surface 114 and the second back surface 124, respectively. In this way, the outer side S1 of the pivot 105 covered by the bendable substrate 134 is located between the first back surface 114 and the second back surface 124.

In some embodiment, the sensor 132 generates a sensing signal in response to a user pressing the bendable substrate 134. Further, the foldable electronic device 100 may further include the circuit board 140 and the connector 150. The circuit board 140 can be disposed in the first body 110 or the second body 120, and the connector 150 is used to electrically connect the sensor 132 and the circuit board 140. In the embodiment, the circuit board 140 may be disposed in the second body 120, for example, but the present disclosure is not limited thereto. The sensor 132 can be electrically connected to, e.g., a controller of the circuit board 140 via the connector 150. In the embodiment, the connector 150 can be a flexible connector such as a flexible circuit board, so as to connect the sensor 132 to the circuit board 140 flexibly. With this configuration, when holding the foldable electronic device 100, the user can easily press the key module 130 located on the back surface of the body with his fingers, so that the sensor 132 can generate a corresponding sensing signal according to the user's pressing. The controller of the circuit board 140 can receive the sensing signal and control the foldable electronic device to perform corresponding commands (e.g., confirm, adjust the volume, display brightness or any specific function, etc.) according to the sensing signal.

In the embodiment, the bendable substrate 134 may include a plurality of elastic layers elastically connected between the first body 110 and the second body 120, and the sensor 132 is sandwiched between the plurality of elastic layers. In other embodiments, the bendable substrate 134 can also be injection-molded to directly coat and embed the sensor 132 therein. In an embodiment, the material of the plurality of elastic layers may include Thermoplastic Polyurethane (TPU), rubber, silicone and other elastic materials. In the embodiment, the sensor 132 may include a bending sensor for sensing the deformation of the bendable substrate 134 and generating a sensing signal accordingly. In details, when the sensor 132 senses that the bendable substrate 134 is folded to a preset bending degree, the controller of the circuit board 140 performs a control operation (such as, confirming, adjust volume, monitor brightness, or any specific function, etc.) corresponding to the bending degree.

Figure 5:
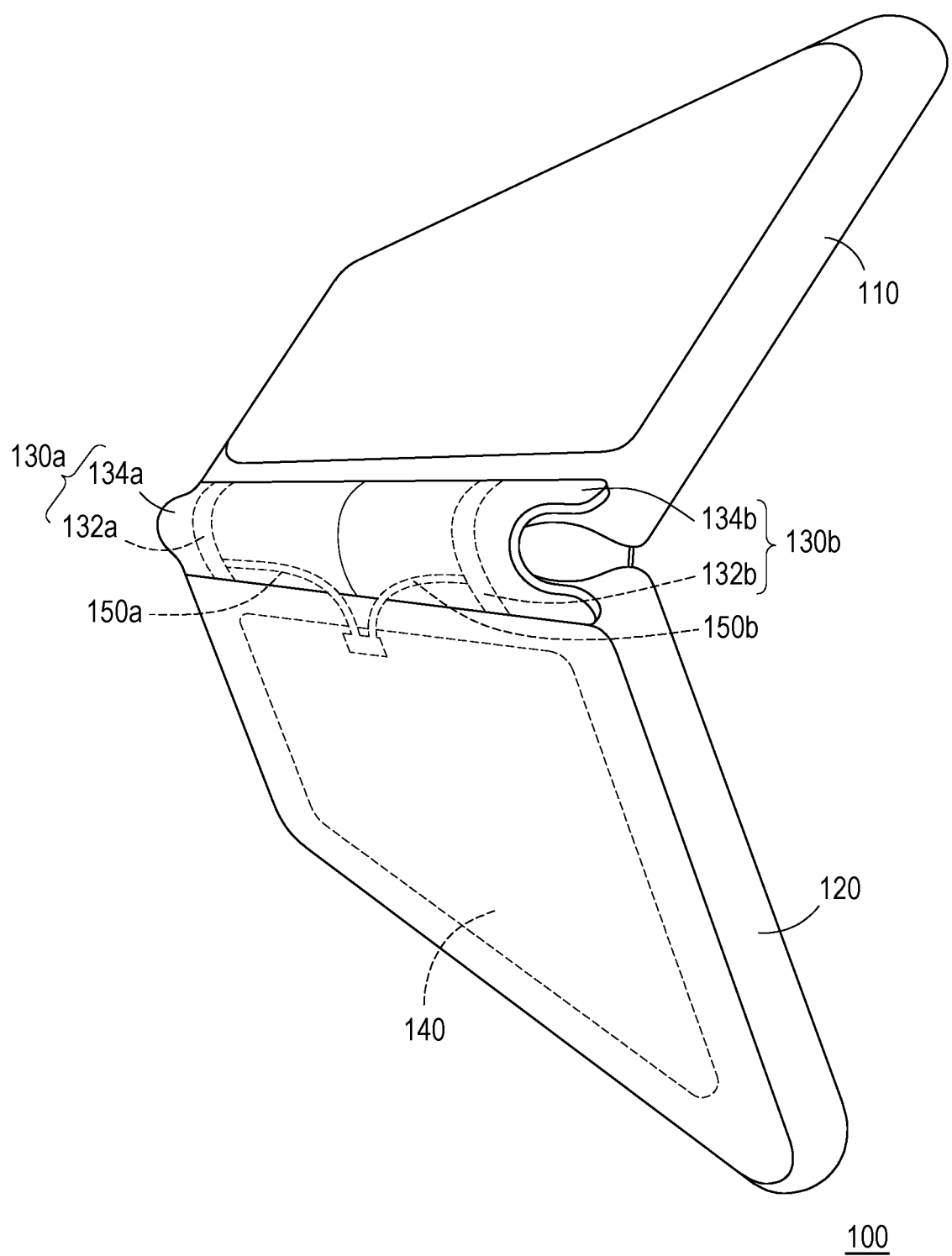
FIG. 5 is a schematic perspective view of a foldable electronic device according to another embodiment of the present disclosure.

FIG. 5 is a schematic perspective view of a foldable electronic device according to another embodiment of the present disclosure. It must be stated here that, the foldable electronic device of this embodiment is similar to the foldable electronic device of the previous embodiment. Therefore, in the embodiment, the element numbers and part of the content of the previous embodiment are used, wherein the same or similar reference numbers are used to represent the same or similar elements, and the description of the same technical content is omitted. For the description of the omitted part, reference may be made to the foregoing embodiments, which will not be repeated in this embodiment. The differences between the foldable electronic device of this embodiment and the foldable electronic device 100 of the previous embodiment will be described below.

Referring to FIG. 5, in the embodiment, the foldable electronic device may include a plurality of key module 130a, 130b, which can respectively generate corresponding (different) sensing signals, so that the controller of the circuit board 140 performs corresponding (different) control operations. For example, in the embodiment, the key module 130a, 130b may have bendable substrates 134a, 134b and sensors 132a, 132b, respectively. In the embodiment, the bendable substrates 134a, 134b are separated from each other so that they can be folded to different degrees according to different degrees of pressing, respectively. The sensors 132a, 132b are embedded in the corresponding bendable substrates 134a and 134b. In an embodiment, the sensors 132a, 132b may be located on opposite sides (e.g., left and right sides) of the back surface of the foldable electronic device, respectively, and the sensors 132a, 132b can be electrically connected to the circuit board 140 through the connectors 150a, 150b, respectively.

With this configuration, when holding the foldable electronic device, the user can easily press the key modules 130a, 130b located on the back surface of the body with their fingers, so that the bendable substrates 134a, 134b are folded accordingly. At this time, the sensors 132a, 132b can respectively sense the deformation of the corresponding bendable substrates 134a, 134b and generate corresponding sensing signals accordingly. For example, when the sensor 132a senses that the bendable substrate 134a is folded to a preset bending degree, a corresponding sensing signal is generated. The controller of the circuit board 140 can receive the sensing signal and control the foldable electronic device to perform corresponding control operations accordingly. In the embodiment, the sensing signal generated by the sensor 132a may be different from the sensing signal generated by the sensor 132b, which respectively correspond to different control operations.

Figure 6:
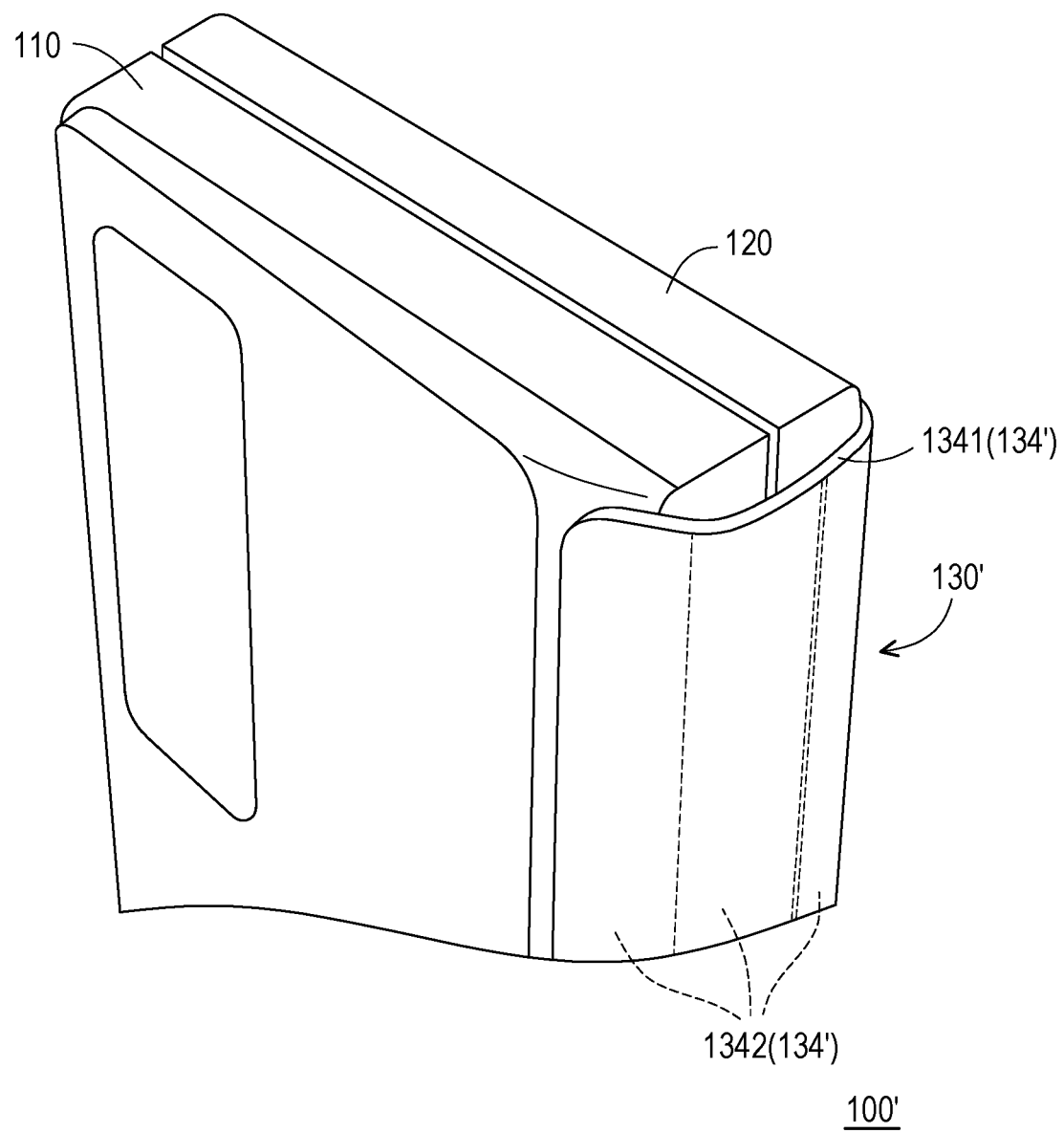
FIG. 6 is a schematic perspective view of a foldable electronic device in a closed state according to another embodiment of the present disclosure.
Figure 7:
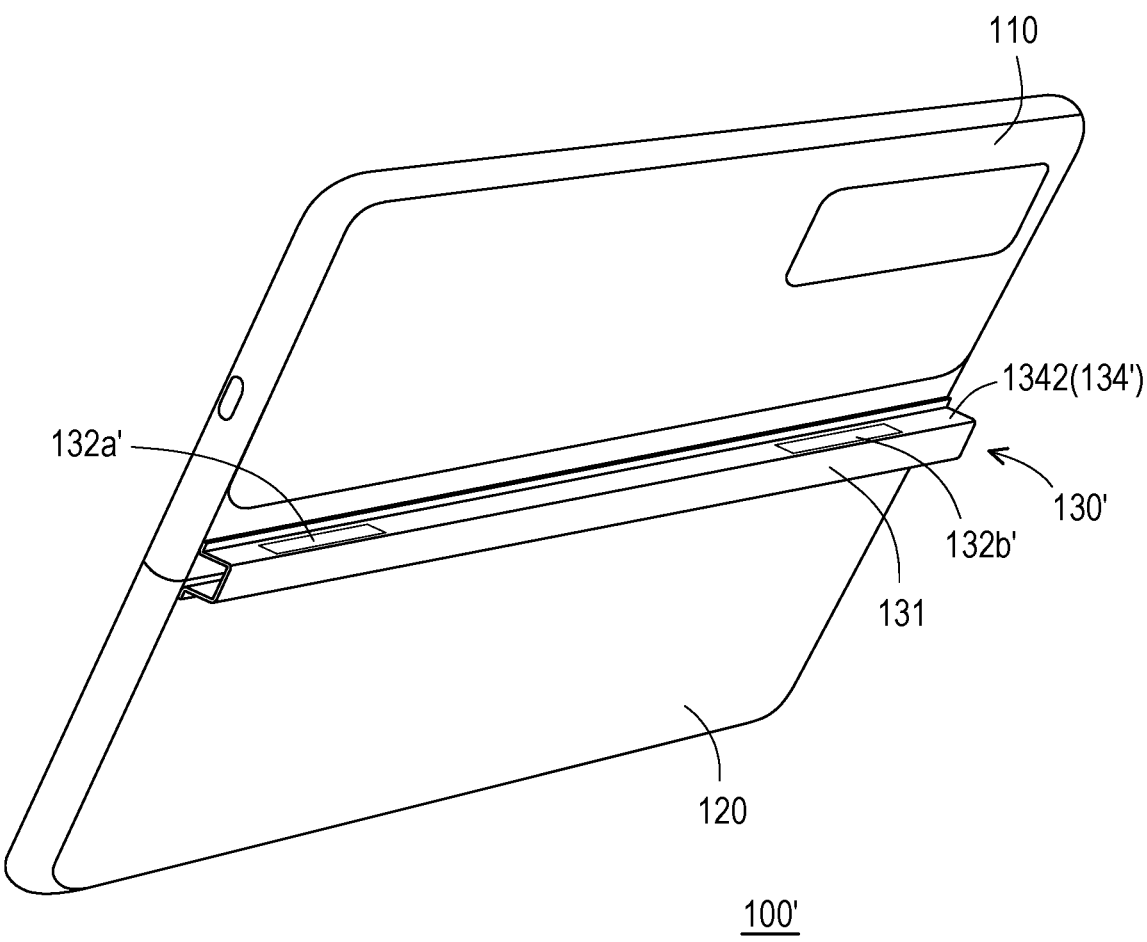
FIG. 7 is a perspective view of the foldable electronic device of FIG. 6 in a fully opened state.
Figure 8:
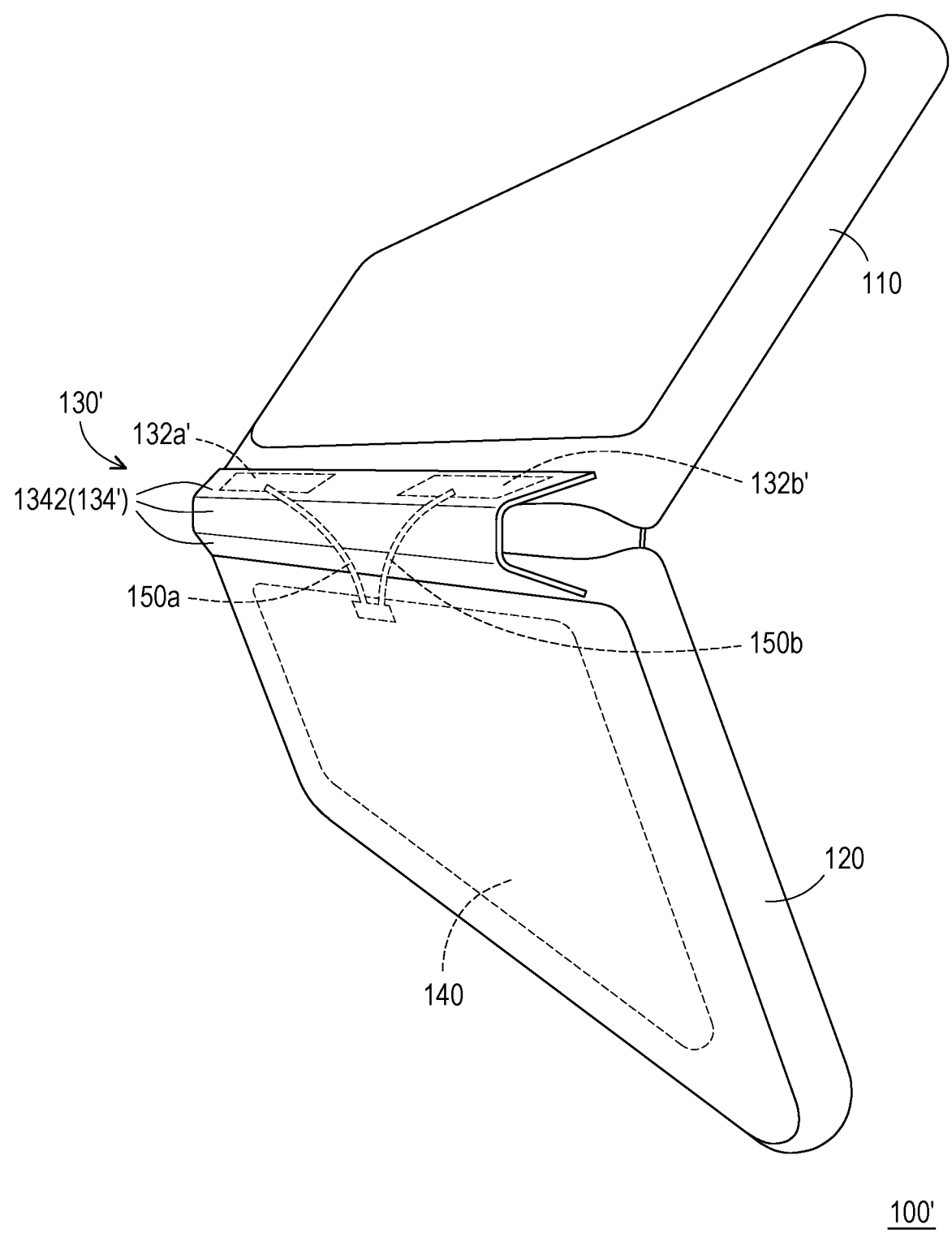
FIG. 8 is a schematic perspective view of the foldable electronic device of FIG. 6 in an open state.

FIG. 6 is a schematic perspective view of a foldable electronic device in a closed state according to another embodiment of the present disclosure. FIG. 7 is a perspective view of the foldable electronic device of FIG. 6 in a fully opened state. FIG. 8 is a schematic perspective view of the foldable electronic device of FIG. 6 in an open state. It must be stated here that, the foldable electronic device 100' of this embodiment is similar to the foldable electronic device 100 of the previous embodiment. Therefore, in the embodiment, the element numbers and part of the content of the previous embodiment are used, wherein the same or similar reference numbers are used to represent the same or similar elements, and the description of the same technical content is omitted. For the description of the omitted part, reference may be made to the foregoing embodiments, which will not be repeated in this embodiment. The differences between the foldable electronic device 100' of this embodiment and the foldable electronic device 100 of the previous embodiment will be described below.

Referring to FIG. 6 to FIG. 8 simultaneously, in the embodiment, the bendable substrate 134' may include a plurality of flexible layers 1341 and a plurality of rigid reinforcements 1342. The rigid reinforcements 1342 are sandwiched between the plurality of flexible layers 1341, respectively. Specifically, in the embodiment, the bendable substrate 134' has three rigid reinforcements 1342, which are respectively sandwiched between two flexible layers 1341. However, the present disclosure does not limit the number of the flexible layer 1341 and the number of the rigid reinforcing member 1342. In the embodiment, the flexible layers 1341 are connected between the first body 110 and the second body 120. And the rigid reinforcements 1342 are arranged parallel to each other and spaced apart from each other, so that the flexible layers 1341 can be folded in the gaps between the plurality of rigid reinforcements 1342. In the embodiment, the plurality of rigid reinforcements 1342 can be arranged parallel to the long axes of the first body 110 and the second body 120, so that the bendable substrate 134' can be folded along the direction of the long axes of the first body 110 and the second body 120 to fold with the opening or closing of the foldable electronic device 100'.

In the embodiment, the key module 130' of the foldable electronic device 100' may include a plurality of sensor 132a', 132b' (shown as two), which can be respectively disposed at opposite ends of the same rigid reinforcement 1342. In other embodiment, the foldable electronic device may also be provided with more or less sensors, and the present disclosure is not limited thereto. In general, the plurality of sensors 132a', 132b' may be arranged on the same rigid reinforcement 1342, so that they are located on the same plane, so as to facilitate the user's pressing operation. However, in other embodiment, sensors can also be set on different rigid reinforcements 1342 according to actual design requirements. In the embodiment, the sensor 132a', 132b' may be pressure sensors, such as piezoresistive pressure sensors, capacitive pressure sensors, etc. In this way, when the user presses the rigid reinforcement 1342, if the sensors 132a', 132b' sense that the pressure is greater than a pre-set value, a corresponding sensing signal can be generated accordingly. The controller of the circuit board 140 can receive the sensing signal and control the foldable electronic device 100' to perform corresponding control operations accordingly.

Specifically, the piezoresistive pressure sensor may include elements such as a pressure sensing material, an upper electrode and a lower electrode. When the user presses the rigid reinforcement 1342, the pressure sensing material of the sensor is pressed and contacts the lower electrode, so that the upper electrode and the lower electrode are connected. After the pressure sensing material is pressed, the resistance becomes smaller. The sensors 132a', 132b' can generate corresponding sensing signals based on the change of the resistance, so as to control the foldable electronic device 100' to perform corresponding control operations. In another embodiment, if the above-mentioned pressure sensing materials are replaced with insulating materials, a capacitive pressure sensor can be formed. The upper electrode and the lower electrode constitute the two metal electrodes of the capacitive pressure sensor. When the user presses the rigid reinforcement 1342, the distance between the upper electrode and the lower electrode gets closer and closer, and the capacitance gradually increases. The sensor 132a', 132b' can generate corresponding sensing signals based on the change of the capacitance, so that the foldable electronic device 100' can be controlled to perform corresponding control operations.

In summary, the foldable electronic device of the present disclosure sets the key module at the pivot on the back of the body, so that the bendable substrate of the key module covers the outer side of the pivot, and the sensor is embedded in the bendable substrate. With this configuration, when holding the foldable electronic device, the user can easily press the key module located on the back of the body with a finger, so that the sensor generates a corresponding sensing signal in response to the user's pressing. And the controller of the circuit board can receive the sensing signal and control the foldable electronic device to make corresponding commands accordingly. Therefore, the foldable electronic device of the present disclosure can expand the function keys in a limited space, and its setting position is more convenient for the user to press and operate. Thus, the design flexibility, operation convenience and user friendliness of the foldable electronic device can be improved.

What is claimed is:

1. A foldable electronic device, comprising:
a first body and a second body;
a pivot, pivotally connected between the first body and the second body, wherein the first body and the second body is configured to rotate relatively to each other through the pivot; and
a key module comprises a bendable substrate and a sensor embedded in the bendable substrate, wherein the bendable substrate is covered a part of the first body and a part of the second body and covers an outer side of the pivot, and the sensor generates a sensing signal in response to a press of a user upon the bendable substrate,
the first body, the second body, the outer side of the pivot and the key module together enclose a space,
wherein the bendable substrate comprises a plurality of flexible layers and a plurality of rigid reinforcements respectively sandwiched between the plurality of flexible layers,
wherein the plurality of flexible layers are connected between the first body and the second body, and the plurality of rigid reinforcements are arranged spaced apart from each other such that the plurality of flexible layers are suitable for bending between the plurality of rigid reinforcements.

2. The foldable electronic device according to claim 1, wherein the first body comprises a first back surface, the second body comprises a second back surface, the outer side of the pivot is located between the first back surface and the second back surface, and the bendable substrate is connected to the first back surface and the second back surface respectively.

3. The foldable electronic device according to claim 1, further comprises a circuit board, located in the first body or the second body.

4. The foldable electronic device according to claim 3, further comprises a connector, electrically connected to the sensor and the circuit board.

5. The foldable electronic device according to claim 1, wherein the bendable substrate comprises a plurality of elastic layers, elastically connected between the first body and the second body and the sensor is sandwiched between the plurality of elastic layers.

6. The foldable electronic device according to claim 1, wherein the sensor comprises a bending sensor, configured to sense the deformation of the bendable substrate and generate the sensing signal accordingly.

7. The foldable electronic device according to claim 1, wherein the sensor is located on the plurality of rigid reinforcements.

8. The foldable electronic device according to claim 7, wherein the sensor comprises a pressure sensor.

9. A foldable electronic device, comprising:
a first body and a second body;
a pivot, pivotally connected between the first body and the second body, wherein the first body and the second body is configured to rotate relatively to each other through the pivot; and
a key module comprises a bendable substrate and a sensor embedded in the bendable substrate, wherein the bendable substrate is connected between the first body and the second body and covers an outer side of the pivot, and the sensor generates a sensing signal in response to a press of a user upon the bendable substrate, a distance is located between the key module and the outer side of the pivot, a rotation of the first body and the second body relative to the pivot drives the key module to bend and changes the distance,
wherein the first body comprises a first back surface, the second body comprises a second back surface, the outer side of the pivot is located between the first back surface and the second back surface, and the bendable substrate is connected to the first back surface and the second back surface respectively,
the first body comprises a display, the second body comprises a keyboard module, the display and the keyboard module are opposite to the first back surface and the second back surface.

* * * * *